United States Patent

[11] 3,621,054

| [72] | Inventor | Kenneth L. Olivier |
| | | 709 Emerald Way, Placentia, Calif. 92670 |
| [21] | Appl. No. | 657,011 |
| [22] | Filed | July 31, 1967 |
| [45] | Patented | Nov. 16, 1971 |

[54] PRODUCTION OF METHACRYLIC ACID
14 Claims, No Drawings

[52] U.S. Cl. ..................................................... 260/533 A,
260/497 A
[51] Int. Cl. ......................................................C07c 51/32,
C07c 67/00
[50] Field of Search........................................... 260/533 A,
497 A

[56] References Cited
UNITED STATES PATENTS
3,346,625  10/1967  Fenton et al.................. 260/533
3,415,871  12/1968  Olivier.......................... 260/533 A
3,381,030   4/1968  Biale et al..................... 260/497 A Primary Examiner—Lewis Gotts
Assistant Examiner—R. S. Weissberg
Attorneys—Milton W. Lee, Richard C. Hartman, Lannas S. Henderson and Robert E. Strauss ABSTRACT: Methacrylic acid is produced by the oxidative carbonylation of propylene by contacting propylene, oxygen and carbon monoxide in the presence of a Group VIII noble metal catalyst containing a redox agent and an alkali metal acetate. Preferably the oxidation is performed in liquid phase comprising a low molecular weight fatty acid as the solvent. In a typical embodiment, the Group VIII noble metal concentration is from 0.001 to 1.0 molar, the concentration of the redox metal is from 0.05 to 0.5 molar, the concentration of the halide anion is from 0.1 to 0.5 molar and the carbon monoxide partial pressure is from 10 to about 70 percent of the total pressure which is from about 300 to 3,000 p.s.i.g. Under these conditions a substantial portion of the product comprises the desired methacrylic acid.

PRODUCTION OF METHACRYLIC ACID

DESCRIPTION OF THE INVENTION

Copending application Ser. No. 371,751 discloses the oxidative carbonylation of olefins to produce beta acetoxy alkanoic acids and alpha-beta ethylenically unsaturated carboxylic acids having one more carbon atom than the reactant olefin. The reaction is disclosed as being performed in liquid phase with catalytic amounts of a Group VIII noble metal and a multivalent heavy metal redox agent. Under these conditions high yields of the desired acids, e.g., acrylic acid, beta acetoxy propionic acid, crotonic acid, etc., are obtained from the reactant olefin.

When this reaction is applied to the oxidative carbonylation of propylene, unfortunately the predominant product is crotonic acid or a beta-acyloxy butyric acid resulting from the addition of the carboxylic acid solvent to the crotonic acid. Since crotonic acid does not have the commercial value of methacrylic acid, the product is the less desired of these two possible products of the oxidative carbonylation. Accordingly, the oxidative carbonylation reaction lacks commercial interest when applied to the reaction on propylene.

I have now found that the oxidative carbonylation reaction aforedescribed can be performed on propylene under conditions hereinafter defined which secure a favorably high ratio of methacrylic acid or its addition product, beta-acyloxy isobutyric acid.

Several of the reaction conditions can be controlled to favor the production of methacrylic acid. One factor of significance in influencing the oxidative carbonylation of the internal carbon of propylene rather than a terminal carbon is the use of a reaction medium comprising a carboxylic acid solvent and an alkali metal carboxylate. Other reaction conditions favoring the attack on the internal carbon include: (1) a high concentration of the redox metal; and (2) a limited concentration of halide anions. Carbon monoxide concentration can also be limited to favor the attack on the internal carbon.

The oxidative carbonylation reaction is practiced by the contacting of an olefin, carbon monoxide, and oxygen under substantially anhydrous conditions with a catalyst comprising a Group VIII noble metal which is reduced to a lower valency during the reaction period. The reduced metal is oxidized to a higher valency, preferably by the use of a multivalent heavy metal redox agent which is, itself, maintained in an oxidized state by the introduction of oxygen. Preferably the reaction is performed under liquid phase conditions with a solvent comprising at least about 25 percent of a low molecular weight carboxylic acid.

The reaction can be performed under relatively mild conditions and exhibits an attractive rate at temperatures from about 30° to about 300° C. Pressures employed are from atmospheric to about 200 atmospheres, the higher pressures being favored to accelerate the reaction. The reaction is performed under substantially anhydrous conditions, i.e., with a water concentration less than about 5 volume percent of the sum of the reactants, products and reaction media. Preferably the reaction is initiated in the presence of a suitable dehydrating agent to insure that the oxidative carbonylation will occur and that undesired reactions such as oxidation to carbon dioxide, aldehydes, ketones or unsaturated esters do not occur.

To ensure that water does not accumulate in the reaction zone during the reaction and reach a concentration which precludes the oxidative carbonylation reaction, the water can be eliminated by continuously stripping it from the reaction zone by circulating a large gas volume through the reaction zone. In other embodiments an excess of a dehydrating agent can be added to the reaction zone to eliminate water by the chemical combining thereof. There is no substantial consumption of the dehydrating agent since the major reaction, i.e., oxidative carbonylation, does not produce water. Instead, the water is formed only from spurious side reactions such as the formation of unsaturated esters from the olefin. Accordingly, anhydrous conditions can be maintained by the addition of limited quantities of a dehydrating agent to the reaction zone. The dehydrating agent can be a solid, e.g., a solid inorganic acid anhydride or a dehydrated molecular sieve as disclosed in copending applications Ser. Nos. 434,092 and 443,638, or can be an organic dehydrating agent as disclosed in copending application 371,751.

When the reaction is performed in vapor phase using a heterogeneous catalyst, the catalyst support can suitably be the solid dehydrating agent such as the dehydrated molecular sieve. In other embodiments, the organic dehydrating agents can be added by entraining or vaporizing it into the reactant mixture supplied to the reaction zone. When liquid phase contacting is employed, the dehydrating agent can be incorporated in the liquid phase reaction medium and can comprise from 0.1 to about 50 weight percent of the liquid reaction medium. Preferably, from 2 to 20 and, most preferably, from 5 to about 15 weight percent of this medium comprises the dehydrating agent.

As used herein, the term "molecular sieve" defines solids comprising crystalline aluminosilicates or zeolites which are either naturally occurring or synthetic compositions of alumina and silica having a crystalline structure, a characteristic X-ray diffraction pattern, and a relatively uniform pore size from about 4 to about 13 Angstrum units. Based on their ability to preferentially absorb various compounds within the pores, these materials have come to be known as molecular sieves.

The preparation of synthetic molecular sieves is a well established art; see U.S. Pat. Nos. 2,882,243 and 2,882,244 wherein a method of preparation is set forth comprising the mixing of sodium silicate, sodium aluminate and sodium hydroxide to form a gel. The gel is then maintained at a temperature between about 100° and 160° C. to induce crystallization of the solid therefrom, then filtered, washed and pelleted or compacted to the desired form. The solid is then calcined at a temperature from about 200° to about 500° C. to dehydrate the solid and form an active molecular sieve. The sodium cations associated with the molecular sieve can be replaced with different cations by washing with an aqueous solution of a soluble salt of the other cation to base exchange all or a portion of the sodium with one or more of the chosen cations, e.g., hydrogen, ammonium, lithium, potassium, calcium, magnesium, silver, zinc, nickel, strontium, palladium, platinum, iron, cobalt, etc. A description of the base exchange procedure can be found in the aforesaid patents.

Any of the naturally occurring or synthetic molecular sieves which are inert to the reaction medium and the oxidation conditions employed in our oxidative carbonylation can be employed. Preferably, zeolites having a silica to alumina molecular ratio of at least about 3 and most preferably greater than 5 are employed to ensure that the molecular sieve is inert toward the carboxylic acid generally employed as the reaction solvent and toward halogen acids formed on reduction of the redox system. Examples of suitable naturally occurring zeolites having the aforementioned silica to alumina ratios are: ptilolite, mordenite, laumontite, ferrierite, erionite, epistilbite, stilbite, heulandite, dachriardite, harmontone, etc. Various synthetic zeolites having ratios of silica to alumina greater than about 5 are: zeolite S, zeolite Y, zeolite Z, zeolite T, etc.

The inorganic solid acid anhydride which can be used as the dehydrating agent in the oxidative carbonylation comprises any inorganic acid anhydride which is nonreactive to the organic reactions, products and catalysts, i.e., the platinum group metal and redox agent. Examples of suitable inorganic acid anhydrides are: antimonic, antimonous, boric, molybdic, permolybdic, phosphatomolybdic, permolybdic tungstic, silicic, silicotungstic, titanic, tungstic, uranic, etc.

As previously mentioned, the preferred dehydrating agent for the liquid phase reaction is an organic anhydride that is soluble in the reaction media. For ease of handling such a dehydrating agent should have from two to about 25 carbons and examples of suitable classes of compounds are: acid anhydrides, alkane and benzene carboxylic acids, acyloxy halides, N,N'-alkyl and aryl substituted carbodiimides, etc.

Examples of the acid anhydrides include acetic, propionic, butyric, valeric, caproic, caprylic, capric anhydride, etc.; and phthalic, benzoic anhydrides, etc.

Examples of suitable acyl halides of which the chlorides are preferred include the halides of alkanoic and benzene carboxylic acids such as acetyl chloride, propionyl chloride, valeroyl fluoride, capryloyl chloride, benzoyl chloride, toluolyl chloride.

Examples of suitable isocyanates include the alkyl and aryl isocyanates such as methyl isocyanate, phenyl isocyanate, toluene diisocyanate, amyl isocyanate, isooctyl isocyanate.

Examples of suitable carbodiimides include N,N'-dimethylcarbodiimide, N,N'-diethylcarbodiimide, N,N'-diisopropylcarbodiimide, N,N'-dibutylcarbodiimide, N-amyl N'-ethylcarbodiimide, N,N'-dicyclohexylcarbodiimide, N,N'-diphenyldicarbodiimide, N,N'-dibenzyldicarbodiimide.

Examples of suitable ketenes and alkyl ketenes or their dimers include ketene, methyl ketene, dimethyl ketene, ethyl ketene, propyl ketene, etc.

When the soluble organic dehydrating agent is employed it is judiciously selected so that the product of its reaction with water is the same as the reaction solvent. Thus, when acetic acid is the reaction solvent, ketene and acetyl halide or acetic anhydride are the best chosen dehydrating agents; with propionic acid either methyl ketene or a propenyl halide or propionic anhydride are best. As previously mentioned the reaction is performed in the presence of a liquid organic solvent and preferably, when a soluble organic anhydride is used, the solvent comprises at least about 10 and most preferably at least about 75 weight percent of an alkanoic acid. Various acids can be used such as formic, acetic, propionic, butyric, pentanoic, hexanoic, heptanoic, octanoic, benzoic, toluic, phthalic acids, etc. Of these the fatty carboxylic acids having from about two to about eight carbons are preferred. The carboxylic acids are not entirely inert within the oxidation in that the carboxylic acids add to the olefinic bond to form beta-acyloxy acids. These acids, however, can be readily pyrolyzed to recover the carboxylic acid and the alpha,beta-ethylenically unsaturated acid.

Other organic solvents that can be employed in combination with the aforementioned carboxylic acid include the alkyl and aryl sulfoxides and sulfones such as dimethyl sulfoxide, propylethylsulfoxide, diisopropylsulfone, ethylmethylsulfoxide, butylamylsulfone, diethylsulfoxide, diphenylsulfoxide, diphenylsulfoxide, methylbenzylsulfone, etc.

Another class of organic solvents which can be employed in combination with the carboxylic acids are amides such as formamide, dimethylformamide, ethylisopropylformamide, acetamide, N-phenylacetamide, N,N-dipropylacetamide, N-isobutyramide, isovaleric amide, N,N-methyl-n-caprylic amide, N-propyl-n-heptanoic amide, isoundecylic amide.

Various alkyl and aryl ketones can also be employed as the remainder of the reaction solvent, e.g., acetone, methylethyl ketone, diisopropyl ketone, ethyl-n-butyl ketone, methyl-n-amyl ketone, cyclohexanone, diisobutyl ketone, etc.

Ethers can also be employed as a reaction solvent, e.g., diisopropyl ether, di-N-butyl ether, ethylene glycol, diisobutyl ether, methyl-o-tolyl ether, ethylene glycol dibutyl ether, diisoamyl ether, methyl-p-tolyl ether, dichloroethyl ether, ethylene glycol diisoamyl ether, ethylbenzyl ether, diethylene glycol dimethyl ether, ethylene glycol dibutyl ether, ethylene glycol diphenyl ether, triethylene glycol triethyl ether, triethylene glycol diethyl ether, tetraethylene glycol dimethyl ether, tetraethylene glycol dimethyl ether, tetraethylene glycol dibutyl ether, etc.

The catalyst for the oxidative carbonylation comprises a Group VIII noble metal which can be of the palladium subgroup, i.e., palladium, rhodium or ruthenium or of the platinum subgroup, i.e., platinum, osmium or iridium. While all of these metals or their salts are active for the reaction, I prefer the use of palladium and/or its salts because of their demonstrated greater activity.

The platinum group metal can be employed in the liquid reaction medium in amounts from about 0.001 to about 5.0 weight percent; preferably between about 0.04 and 2.0 weight percent. In the vapor phase processing the platinum group metal can be supported on an inert carrier or, suitably, supported on the dehydrated molecular sieves or other solid substrates such as silica, alumina, titania zirconia, etc. and mixtures thereof. To impregnate the solid support with from 0.01 to about 10.0 weight percent of the platinum group metal the platinum group metal can be employed in the reaction as a salt or in metallic form. In the liquid phase processing, homogeneous catalysis is preferred and accordingly soluble salts or chelates of the platinum group metal are employed. These same salts could be used to impregnate the solid support used in the heterogeneous vapor phase catalysis. When salts are employed, examples of suitable salts include the halides and carboxylates having from one to about five carbons such as palladium chloride, rhodium acetate, ruthenium bromide, osmium propionate, iridium fluoride, palladium isobutyrate, osmium valerate, palladium bromide, etc. Examples of suitable chelates are palladium acetyl acetonate and complexes of the platinum group metal ions with such conventional chelating agents as ethylene diamine tetraacetic acid, citric acid, etc.

Redox agents are employed to facilitate the rate of reoxidation of the reduced species of the platinum group metal to its more active oxidized form. While this reoxidation can be performed to some extent with the use of molecular oxygen, it is preferred to incorporate the redox agent and increase this rate of oxidation. Examples of suitable redox agents are the salts of multivalent metal ions having an oxidation potential more positive than the platinum group metal in the catalyst. Examples of suitable multivalent metal compounds are the halides, carboxylates, nitrates, etc., of copper, iron, vanadium, chromium, manganese, etc. Of these, copper salts are most preferred. The anions of the salts can be the halides, e.g., chloride, bromides, iodides or fluorides, or can be soluble carboxylates, e.g., acetates, propionate, isobutyrate, valerate, etc. The redox compound is employed in the reaction system in concentrations from about 0.05 to 1.0 molar; preferably from about 0.1 to about 0.5 molar. A solution of the salt can also be used to impregnate the solid support used in the vapor phase contacting to incorporate from about 0.14 to about 10 weight percent of the redox metal compound on the solid support.

This invention comprises control of the catalyst composition and process variables to insure a high yield of methacrylic acid from propylene. To ensure this high yield of methacrylic acid, an alkali metal carboxylate is incorporated in the reaction medium or on the inert catalyst support. Examples of suitable alkali metal carboxylates include the alkali metal salts of the fatty acids having from about one to about 10 carbons such as lithium acetate, sodium acetate, cesium acetate, lithium propionate, sodium propionate, cesium isobutyrate, lithium butyrate, sodium valerate, potassium octanate, potassium acetate, etc. When the alkali metal carboxylate is used in a liquid phase, homogeneous catalysis, its concentration can be from 0.01 to 1.0 molar. Preferably the concentration employed is from about 0.25 to about 0.5 molar. When the heterogeneous vapor phase catalysis is employed the alkali metal carboxylate can be impregnated on the solid support in an amount comprising from about 0.1 to about 10.0 weight percent; preferably from about 0.5 to about 5.0 weight percent.

The yield of methacrylic acid is favored by limiting the amount of halide in the reaction zone. In general it is desirable to have at least about 0.1 molar concentration of the halide ion, preferably chloride, to facilitate the rate of reoxidation of the reduced platinum group metal. The concentration of the halide ion, however, should not exceed about 0.5 molar and preferably should not exceed about 0.25 molar so that the maximum yield of methacrylic acid is achieved from propylene. This amount of halide anion can be incorporated in the reaction solvent or on the inert support by use of the halide salts of the aforementioned platinum group and/or redox metal salts, or can be added to the reaction system or impregnated on the support by the use of an alkali metal halide salt such as lithium chloride, potassium fluoride, sodium bromide, lithium iodide, etc.

The reaction can be practiced in a batchwise or continuous fashion. In the batch operation the products can be accumulated in the reaction zone until the completion of the reaction and then removed and the desired products recovered. The process can also be operated in a continuous fashion in the vapor phase or in the liquid phase system. In this method the reactants, i.e., olefin, carbon monoxide and oxygen, are continuously introduced into contact with the catalyst and the products of the oxidative carbonylation are withdrawn either as a vapor or liquid effluent from the reaction zone. In the vapor phase processing the products are, of course, withdrawn as a vaporous effluent; in the liquid phase processing the products can be withdrawn as a vapor by using a sufficient sweep of an inert gas or excess of the reactants to strip the product from the reaction medium. If desired the products can be left to accumulate in the reaction zone and a portion of the liquid phase can be intermittently or continuously withdrawn during processing for recovery of the liquid products therefrom. After recovery of the liquid products the remaining solution containing the catalyst can be recycled to further processing. In a variation of the heterogeneous liquid phase catalysis, the catalyst can be supported in a tower impregnated on an inert solid support such as the aforementioned and oxygen and carbon monoxide can be introduced into cocurrent or countercurrent contact with a liquid comprising the reaction medium and all or a portion of the catalyst.

The gaseous effluent after separation of the products can be repressured and recycled to further contacting in the reaction zone.

The oxygen is introduced into contact with the catalyst at a rate controlled in response to the oxygen content of the exit gases from the reaction zone. Preferably the rate of oxygen introduction is controlled relative to the olefin and carbon monoxide rates so as to maintain the oxygen content of the exit gases below the explosive concentration, e.g., less than about 10 and preferably less than about 3 volume percent. When the olefin is a liquid under reaction conditions, an inert gas such as nitrogen, air or mixtures of nitrogen and air can be employed to dilute the gas phase and exit gas stream from the reactor and thereby avoid explosive gas compositions.

The carbon monoxide is introduced into contact with the reactants at a sufficient rate to insure that the desired carbonylation occurs. The production of methacrylic acid is affected somewhat by the concentration of the carbon monoxide employed in the reaction zone and it is preferred that the carbon monoxide partial pressure be between about 10 and about 70 percent of the total pressure in the reaction zone.

The reaction can be performed under relatively mild conditions including temperatures from about 30° to about 300° C.; preferably from about 90° and about 200° C. The reaction pressure employed is sufficient to insure the rate of the reaction and in general is from about 30 to about 3,000 p.s.i.g., preferably from about 300 to about 1,500 p.s.i.g.

The following examples will illustrate the practice of my invention and serve to illustrate the results obtainable thereby.

EXAMPLE 1

In this and in the succeeding examples the oxidative carbonylation of propylene was performed in a 1-gallon, stirred, Teflon-lined autoclave. The reactants were pressured into the autoclave at the indicated pressure and during the runs nitrogen was added to maintain an operating pressure of about 900–1,000 p.s.i.g. The products were analyzed by gas chromatography and by distillation. The carbon monoxide and propylene reactants were pressured to the autoclave at room temperature and the oxygen was introduced after the autoclave had been heated to the indicated reaction temperature, the oxygen being added slowly at 20 p.s.i. increments.

In the first experiments, the autoclave was charged with a reaction solvent comprising 400 grams acetic acid and 100 grams acetic anhydride containing 1 gram palladous chloride, 5 grams cupric chloride, 5 grams lithium chloride and 5 grams lithium acetate. In the first series of experiments the concentration of the carbon monoxide reactant was varied employing an initial charge at room temperature of 300, 500, and 700 p.s.i., respectively. The autoclave was heated to 300° F. and maintained at that temperature for 30 minutes during which the oxygen was added in 20 p.s.i. increments. The results obtained were as follows:

TABLE 1

| Run | Propylene, grams | CO, p.s.i. | Product-acids |||| Beta-acetoxy acids ||
|---|---|---|---|---|---|---|---|---|
| | | | Methacrylic | Crotonic | Butyric | Isobutyric | n-Butyric | Iso-butyric |
| 1 | 270 | 300 | 21.2 | 46.6 | 32.6 | 26.7 | 14 | 20 |
| 2 | 241 | 500 | 0 | 109 | 0 | 0 | 47 | 0 |
| 3 | 279 | 700 | 5.9 | 57.9 | 7.7 | 45.4 | 107 | 11 |

The preceding demonstrates that it is desirable to maintain a relatively low concentration of carbon monoxide during the reaction to favor the desired methacrylic acid. Although the production of other acids such as crotonic and its addition product beta-acetoxy-n-butyric acid is not precluded, the amount of this production is minimized by low carbon monoxide pressure; compare run 1 to runs 2 and 3.

EXAMPLE 2

In this example the experiments were repeated in the autoclave with variations in the concentration of the lithium acetate component of the catalyst. The reaction solvent comprised 400 grams of acetic acid and 100 grams acetic anhydride containing 1 gram palladous chloride, 5 grams cuprous chloride, 5 grams lithium chloride and, in successive experiments, 10 and 20 grams lithium acetate dihydrate. The reaction was performed at 300° F. and 500 p.s.i. of carbon monoxide was charged to the reaction zone. The reaction time was 30 minutes and the following results were obtained:

TABLE 2

| Run | Propylene grams | LiOAc, grams | Products |||| Beta-acetoxy ||
|---|---|---|---|---|---|---|---|---|
| | | | Methacrylic | Crotonic | Butyric | Isobutyric | n-Butyric | Iso-butyric |
| 4 | 250 | 10 | 5.8 | 62.2 | 19.3 | 15.9 | 89 | 8 |
| 5 | 254 | 20 | 15.3 | 71.0 | 19.0 | 11.9 | 47 | 10 |

The preceding data evidence that increase of the acetate concentration results in increased production of methacrylic acid; compare run 2 with runs 4 and 5.

EXAMPLE 3

In the following example, the experiments were repeated in the autoclave using the reaction solvent comprising 400 grams acetic and 100 grams acetic anhydride. The carbon monoxide pressure initially charged was again 500 p.s.i. The autoclave was heated to 300° F. and maintained at that temperature over a 30-minute reaction period. The concentration of the redox agent, cupric chloride, was varied in successive experiments using 10 and 20 grams of the cupric chloride in the reaction zone. The catalyst composition was otherwise identical; 1 gram palladous chloride, 5 grams lithium chloride and 5 grams lithium acetate. Under these conditions the following results were obtained:

TABLE 3

| Run | Propylene, grams | CuCl$_2$, grams | Products | | | | Beta-acetoxy | |
|---|---|---|---|---|---|---|---|---|
| | | | Methacrylic | Crotonic | Butyric | Isobutyric | n-Butyric | Iso-butyric |
| 6 | 261 | 10 | 5.0 | 26.5 | 21.1 | 27.2 | 53 | 10 |
| 7 | 274 | 20 | 14.3 | 17.6 | 24.3 | 32.0 | 36 | 30 |

The results of this experiment should be compared to run 2, table 1 performed at the same conditions except that 5 grams of the cupric chloride redox agent was employed. These data evidence that increasing the concentration of the redox agent favors the production of methacrylic acid by the oxidative carbonylation of propylene.

The preceding examples are intended solely to illustrate the invention and to demonstrate results obtainable thereby. It is not intended that the examples or the description be construed as unduly limiting of the invention but instead it is intended that the invention be defined by the reagents and method steps and their obvious equivalents set forth in the following method claims.

I claim:

1. The oxidative carbonylation of propylene which comprises contacting propylene, carbon monoxide and oxygen with a catalyst comprising the metal, halide or carboxylate having between about one and five carbon atoms of a Group VIII noble metal selected from the group consisting of palladium, rhodium, ruthenium, platinum, osmium and iridium in an amount effective for oxidative carbonylation with a redox agent comprising the metal, halide or carboxylate having between about one and five carbon atoms of a multivalent metal ion having an oxidation potential more electropositive than said Group VIII noble metal and an alkali metal carboxylate having between about one and 10 carbon atoms at a temperature from about 30° to about 300° C., a total pressure from about 1 to about 200 atmospheres, and a partial pressure of carbon monoxide between about 10 and 70 percent of said total pressure.

2. The oxidative carbonylation of claim 1 wherein said reaction is performed in liquid phase in the presence of a reaction medium comprising from about 10 to about 100 weight percent of a carboxylic acid having from one to about 10 carbons and wherein said pressure is from about 1 to about 100 atmospheres, sufficient to maintain liquid phase conditions.

3. The oxidative carbonylation of claim 1 wherein said multivalent metal ion is a copper ion.

4. The oxidative carbonylation of claim 1 wherein said redox agent is cupric chloride.

5. The oxidative carbonylation of claim 2 wherein the alkali metal carboxylate is employed at a concentration between about 0.01 and about 1.0 molar.

6. The oxidative carbonylation of claim 2 wherein the concentration of the redox agent is from about 0.05 to about 1.0 molar.

7. The oxidative carbonylation of claim 2 wherein a halide ion is present in said reaction medium at a concentration of between about 0.1 and 0.5 molar.

8. The oxidative carbonylation of claim 1 wherein the partial pressure of carbon monoxide in the reaction zone is from about 10 percent to about 50 percent of the total reaction pressure.

9. The oxidative carbonylation of claim 1 wherein said Group VIII noble metal is palladium.

10. The oxidative carbonylation of claim 2 wherein said alkali metal carboxylate is lithium acetate.

11. The oxidative carbonylation of claim 2 wherein said reaction medium contains less than about 5 volume percent water.

12. The oxidative carbonylation of propylene to methacrylic acid which comprises contacting in a reaction zone said propylene, carbon monoxide and oxygen with a substantially anhydrous reaction medium having less than about 5 volume percent water and comprising (1) a carboxylic acid having between about one and 10 carbon atoms, (2) from about 0.001 to 5 weight percent of a soluble halide or carboxylate having between about one and five carbon atoms of a Group VIII noble metal selected from the group consisting of palladium, rhodium, ruthenium, platinum, osmium and iridium, (3) from about 0.05 to about 1.0 molar of cupric chloride and (4) from about 0.01 to about 1.0 molar of an alkali metal carboxylate having between one and 10 carbon atoms; maintaining said reaction zone at a temperature of between about 30° and 300° C. and a pressure of between about 1 and 200 atmospheres; said carbon monoxide having a partial pressure between about 10 and 70 percent of said reaction zone pressure.

13. The oxidative carbonylation of claim 12 wherein said alkali metal carboxylate is lithium acetate.

14. The oxidative carbonylation of claim 12 wherein a halide ion is present in said reaction medium at a concentration of between about 0.1 and 0.25 molar.